United States Patent
Pramod et al.

(10) Patent No.: US 10,103,667 B2
(45) Date of Patent: Oct. 16, 2018

(54) MOTOR CONTROL ANTI-WINDUP AND VOLTAGE SATURATION DESIGN FOR ELECTRIC POWER STEERING

(71) Applicant: Steering Solutions IP Holding Corporation, Saginaw, MI (US)

(72) Inventors: Prerit Pramod, Saginaw, MI (US); Julie A. Kleinau, Bay City, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 36 days.

(21) Appl. No.: 15/162,000

(22) Filed: May 23, 2016

(65) Prior Publication Data

US 2016/0352276 A1    Dec. 1, 2016

Related U.S. Application Data (60) Provisional application No. 62/167,520, filed on May 28, 2015.

(51) Int. Cl.
  *H02P 21/24*    (2016.01)
  *H02P 21/00*    (2016.01)
  (Continued)

(52) U.S. Cl.
  CPC .......... *H02P 21/0003* (2013.01); *B62D 5/046* (2013.01); *H02P 29/0241* (2016.02)

(58) Field of Classification Search
  CPC .... H02P 21/0035; H02P 21/06; H02P 21/146; H02P 2207/05; Y02T 10/643
  (Continued)

(56) References Cited

U.S. PATENT DOCUMENTS

| | | | |
|---|---|---|---|
| 2014/0312812 A1* | 10/2014 | Sasaki | H02P 21/0003 318/400.02 |
| 2014/0334204 A1* | 11/2014 | Hamada | H02P 27/085 363/71 |
| 2015/0054433 A1* | 2/2015 | Kim | H02P 6/002 318/400.02 |

FOREIGN PATENT DOCUMENTS

| | | |
|---|---|---|
| CN | 1440587 A | 9/2003 |
| CN | 101299590 A | 11/2008 |

(Continued)

OTHER PUBLICATIONS

CN Search Report: CN Application No. 201610366542.X dated Feb. 2, 2018, pp. 1-3.

(Continued)

*Primary Examiner* — Shawki S Ismail
*Assistant Examiner* — Bradley Brown
(74) *Attorney, Agent, or Firm* — Cantor Colburn LLP (57) ABSTRACT

A system for preventing controller windup in an electric motor includes a limiting module that determines a limited voltage command in response to a commanded voltage exceeding an available voltage of a motor power source, the limited voltage command is applied to an electric motor, a saturation parameter module that determines a saturation parameter based on the limited voltage command, the saturation parameter indicates a magnitude of the commanded voltage exceeding the available voltage, a non-linear processing module that processes the saturation parameter to generate a processed saturation parameter, and a reference current modifier module that generates a modified current command based on the processed saturation parameter, the modified current command is applied to the control system to improve the current command tracking.

18 Claims, 5 Drawing Sheets

(51) Int. Cl.
*H02P 29/024* (2016.01)
*B62D 5/04* (2006.01)

(58) Field of Classification Search
USPC .................................................. 318/400.02
See application file for complete search history.

(56) References Cited

FOREIGN PATENT DOCUMENTS

| | | | |
|---|---|---|---|
| CN | 102983804 | A | 3/2013 |
| CN | 103988419 | A | 8/2014 |
| CN | 104040867 | A | 9/2014 |
| DE | 10038570 | A1 | 12/2001 |
| DE | 102007009538 | A1 | 9/2007 |
| DE | 102008019570 | A1 | 10/2009 |
| DE | 102012205369 | A1 | 10/2013 |
| DE | 112012005678 | T5 | 10/2014 |
| DE | 102014010362 | A1 | 1/2015 |

OTHER PUBLICATIONS

English translation of office action issued in related CN Application No. 201610366542.X, dated Feb. 2, 2018, pp. 1-4.
English translation of office action issued in related DE Application No. 10 2016 109 777.2, dated Oct. 26, 2017, 5 pages.
Office Action dated Feb. 2, 2018.
Office Action dated Oct. 26, 2017.

\* cited by examiner

MOTOR CONTROL ANTI-WINDUP AND VOLTAGE SATURATION DESIGN FOR ELECTRIC POWER STEERING

CROSS-REFERENCES TO RELATED APPLICATIONS

This patent application claims priority to U.S. Provisional Patent Application Ser. No. 62/167,520, filed May 28, 2015 which is incorporated herein by reference in its entirety.

BACKGROUND OF THE INVENTION

The invention relates to motor control anti-windup and voltage saturation design for electric power steering (EPS).

Electric power steering systems require the electric motor providing steering assist to be operated using a method of torque control. When using a Permanent Magnet Synchronous Machine (PMSM), Field Oriented Control (FOC) is utilized. This allows an alternating current (AC) three-phase motor voltage and associated current signals to be transformed into a synchronously rotating reference frame (i.e. d/q axis reference frame). In the d/q axis reference frame, the motor voltages and currents become direct current (DC) quantities. The FOC torque control technique may be implemented either using feedforward methods of control or a closed-loop current feedback control.

Closed-loop current control of electric motors in electric power steering systems has demanding requirements outside of the control system's capability to track the desired assist torque command (e.g. motor torque command). Among these, consistency of performance throughout the operating range of the control system is required, including operation throughout the motor velocity range and operation approaching the supply voltage limit.

Unlike high voltage power applications utilizing PMSMs, the supply voltage available for the control system from the vehicle has limits, and the motor used in vehicle applications is typically sized to deliver steady state power requirements. For closed loop current feedback motor control architectures, the control system is designed to track current step commands with near-zero steady state error. Two integrators, one for each current loop, may be utilized for this purpose. The current controller applies a suitable transformation on the reference and measured currents, in order to obtain voltage commands, which are then applied to the motor via a voltage source inverter (VSI).

Some current control systems are designed as quasi-linear feedback architectures expected to satisfy a given set of linear system performance metrics. However, non-linear constraints associated with the actuator can cause the linear feedback control loop to destabilize when the actuator limits are reached, resulting in degraded overall system performance. This degraded performance can manifest itself both in terms of tracking behavior, torque ripple and audible noise. One such non-linearity in the motor control system is that the total voltage applied to the motor is limited by the amount of voltage available at the input of the VSI. If the linear control loop computes voltage commands that result in an overall voltage command magnitude that is beyond the output of the battery, the voltage commands may need to be limited.

An issue that arises due to the presence of a plant input saturation nonlinearity is that when the controller computes voltage commands (transient or steady-state) beyond the voltage limit of the system, the voltage commands are limited to the maximum available battery voltage. States (or element of the controller that has memory), such as that of an integrator, are incorrect, because they do not conform to the non-limited or pre-limited voltage commands originally computed. If the saturated condition lasts for a period of time, the states of the controller may become highly incorrect. When the system returns to the linear operating range, the states can return to correct values after a certain amount of time, which is dependent on how long the saturation condition lasted. This situation, referred to as controller windup, can produce poor overall control system performance and instability.

Some anti-windup schemes are focused on single-input single-output (SISO) systems, especially PID type controllers. There have been recent advancements in design methodologies for multi-input multi-output (MIMO) AW systems with plant input nonlinearities. However, these techniques are primarily focused on MIMO systems that have independent saturation limits on each control signal. In a PMSM current control system, the nonlinearity is a radial or circular voltage limit, in which both the control signals saturate together.

SUMMARY OF THE INVENTION

In accordance with one aspect of the invention, a system for preventing controlling windup in an electric motor comprises a limiting module that determines a limited voltage command in response to a commanded voltage exceeding an available voltage of a motor power source, the limited voltage command is applied to an electric motor; a saturation parameter module that determines a saturation parameter based on the limited voltage command, the saturation parameter indicates a magnitude of the commanded voltage exceeding the available voltage; a non-linear processing module that processes the saturation parameter to generate a processed saturation parameter; and a reference current modifier module that generates a current command based on the processed saturation parameter, the current command is applied to the control system to improve current command tracking.

A method for controlling windup in an electric motor comprises determining a limited voltage command in response to a commanded voltage exceeding an available voltage of a motor power source, the limited voltage command is applied to an electric motor, determining a saturation parameter based on the limited voltage command, the saturation parameter indicates a magnitude of the commanded voltage exceeding the available voltage, processing the saturation parameter to generate a processed saturation parameter while retaining a nonlinear state; and generating an current command based on the processed saturation parameter, the current command is applied to the control system to improve current command tracking.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
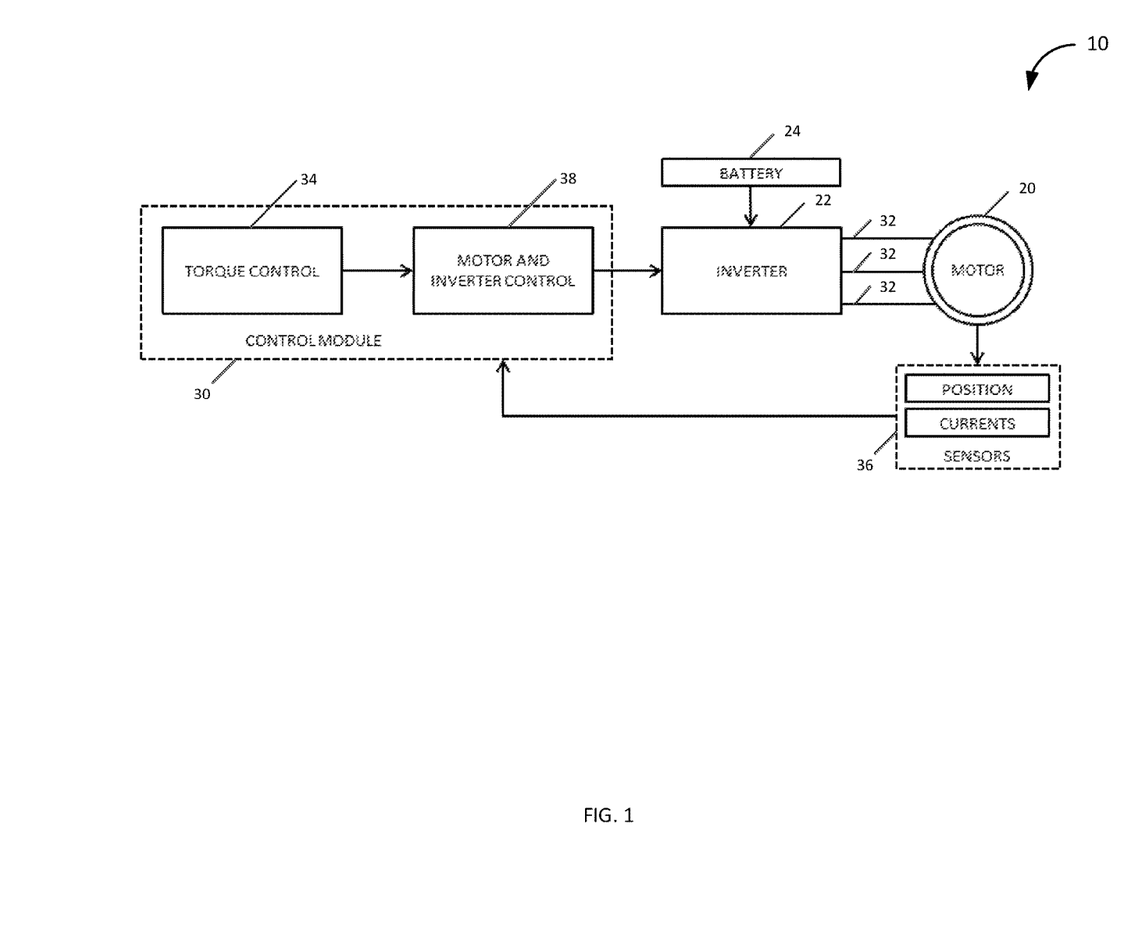
FIG. 1 is an exemplary schematic illustration of a motor control system in accordance with exemplary embodiments.

FIG. 1 illustrates a motor control system 10 in accordance with one aspect of the invention. In the exemplary embodiments as shown, the motor control system 10 includes a motor 20, an inverter 22, a supply voltage 24, and a control module 30 (also referred to as a controller). The voltage supply 24 supplies a supply voltage $V_B$ to the motor 20. In some embodiments, the voltage supply 24 is a 12 volt battery. However, it is to be understood that other types of voltage supplies may be used as well. The inverter 22 is connected to the motor 20 by a plurality of connections 32 (e.g., three connectors) that may be labeled as 'A', 'B' and 'C'. In some embodiments, the motor 20 is a poly-phase, permanent magnet synchronous motor (PMSM). In this example, the motor 20 is a three-phase PMSM. The control module 30 is connected to the motor 20 through the inverter 22.

The control module 30 receives a motor torque command $T_c$ from a torque control system 34 such as, for example, a steering control system. The control module 30 includes control logic for sending a motor voltage command to the motor 20 through the inverter 22.

Figure 2:
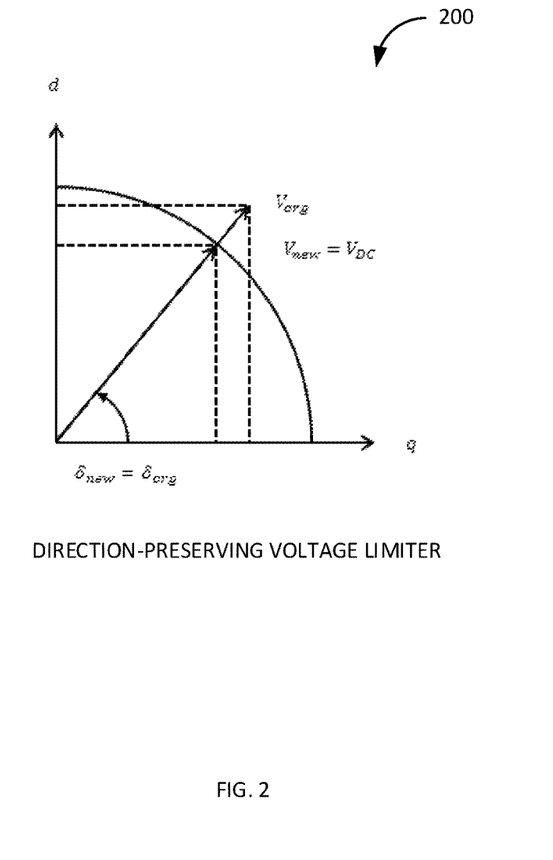
FIG. 2 is a phasor diagram of a motor in accordance with exemplary embodiments.

FIG. 2 with continuing reference to FIG. 1, FIG. 2 represents a phasor diagram 200 of a motor control system, in which the commanded voltage is limited by a direction-preserving voltage limiter. In FIG. 2, a voltage magnitude of the direct axis (d-axis) is represented on the vertical axis, whereas a voltage magnitude of the quadrature axis (q-axis) is represented on the horizontal axis. The motor 20 (FIG. 1) may operate such that a magnitude of a motor voltage command $V_R$, shown in FIG. 2 as $V_{org}$ exceeds the capabilities of the inverter 22. Specifically, the inverter 22 may have an input source voltage limitation, $V_{max}$, which is shown in FIG. 2 as a magnitude of an arc extending between the direct axis (d-axis) and the quadrature axis (q-axis).

To limit the motor voltage command $V_R$ within the operating parameters of the inverter during operational control of the motor 20, $V_{org}$ may modified. As shown in FIG. 2, the motor voltage command $V_R$ may be limited to a magnitude represented by $V_{new}$ which is less than or equal to $V_{max}$. Therefore, $V_{new}$ is within the sourcing capabilities of the inverter. Directional angles of voltage vectors $V_{org}$ and $V_{new}$ are also shown in FIG. 2 as angles $\delta_{org}$ and $\delta_{new}$, respectively. The voltage vectors $V_{org}$ and $V_{new}$ are limited such that the directional angle of $V_{org}$ is preserved (i.e. $\delta_{org} = \delta_{new}$).

Figure 3:
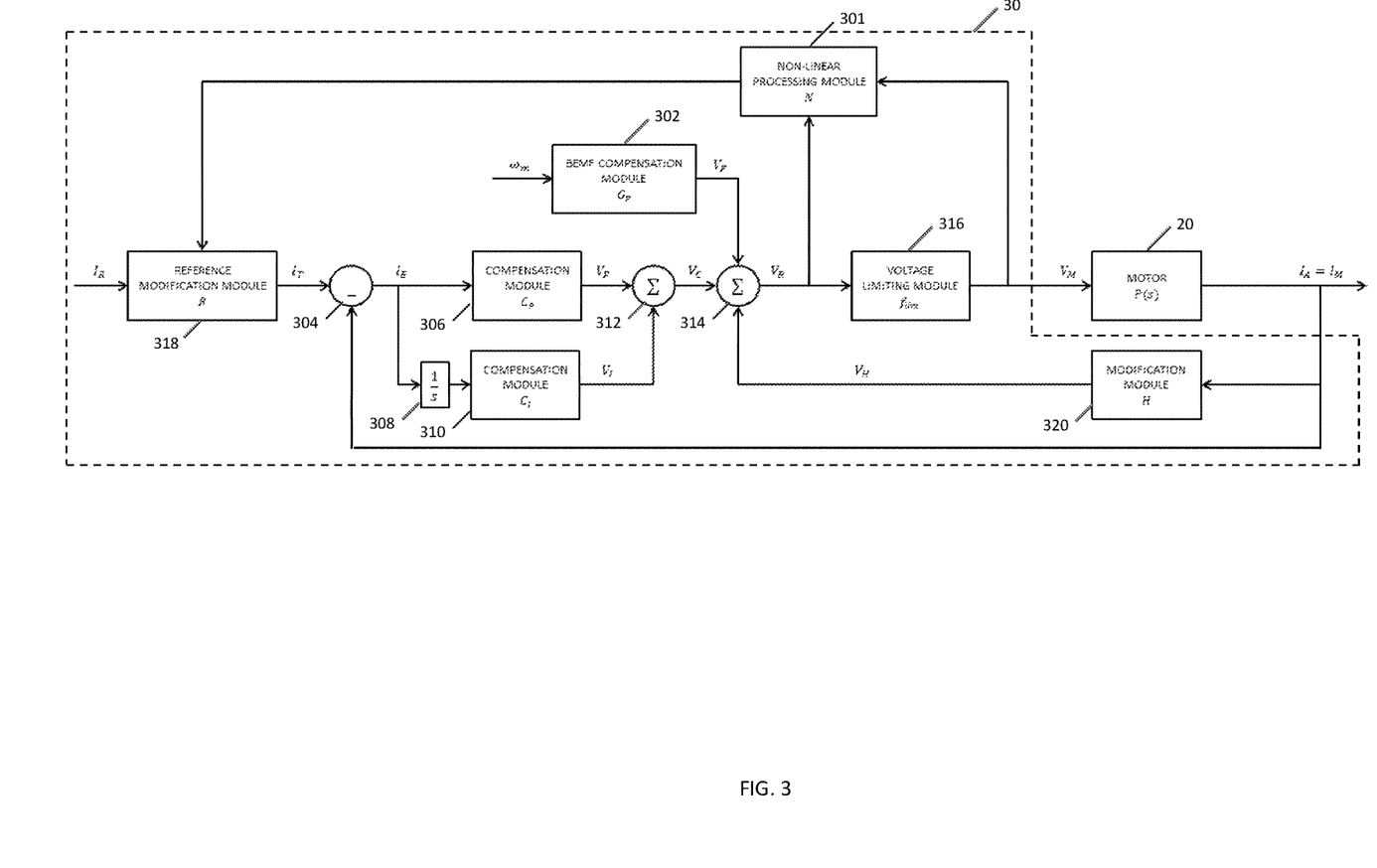
FIG. 3 is an exemplary block diagram of a motor control system including anti-windup module in accordance with exemplary embodiments.

FIG. 3 is a block diagram of the control module 30 including a voltage limiter module 316, a non-linear processing module 301, a reference modification module 318, among other sub-modules, in accordance with some embodiments of the invention. As shown, the control module 30 includes several sub-modules—a BEMF compensation module 302, an integration module 308, compensation modules 306 and 310, a modification module 320, a subtraction module 304 and addition modules 312, 314. FIG. 3 also illustrates the motor 20 (also shown in FIG. 1).

The motor 20 is a plant that is being controlled by the control module 30. That is, the motor 20 receives an actual motor voltage command $V_M$. The actual motor voltage command $V_M$ is based on a motor voltage command $V_R$. The actual motor voltage command $V_M$ may be limited by the limiting module 316, depending on whether the motor voltage command $V_R$ exceeds the capabilities of inverter 22 or other power source of the motor 20. The motor 20 generates torque and current (i.e., draws or outputs the current $I_A$, which is the actual motor current as described above by reference to FIGS. 1 and 2). The following equations defined in the d/q axis coordinate frame may describe the plant transfer function (using line to neutral definitions) of the plant of the motor 20:

$$V_d = L_d \frac{dI_d}{dt} + RI_d + \frac{N_p}{2}\omega_m L_q I_q \quad \text{(Equation 1)}$$

$$V_q = L_q \frac{dI_q}{dt} + RI_q - \frac{N_p}{2}\omega_m L_d I_d + K_e \omega_m \quad \text{(Equation 2)}$$

$$T_e = \frac{3}{2}K_e I_q + \frac{3}{4}N_p(L_q - L_d)I_d I_q \quad \text{(Equation 3)}$$

Where $V_d$, $V_q$ are the d/q motor voltages (in Volts), $I_d$, $I_q$ are the d/q motor currents (in Amperes), $L_d$, $L_q$ are the d/q axis motor inductances (in Henries), R is the motor circuit (motor plus controller) resistance (in Ohms), $K_e$ is the motor BEMF coefficient (in Volts/rad/s), $\omega_m$ is the mechanical motor velocity in (in rad/s), and $T_e$ is the electromagnetic motor torque (in Nm).

In some embodiments, the limiter module 316 is a direction preserving voltage limiter that maintains the original phase angle while reducing the magnitude to the maximum available voltage. However, other voltage limiters may be used for the limiter module 316 that modify both the magnitude and the angle of the voltage command. The limiter module 316 outputs a limited voltage command represented by $V_M$.

The torque equation that provides $T_e$ is nonlinear and represents sum of the torque developed by leveraging the magnetic field from the permanent magnets, and the reluctance torque generated by rotor saliency (difference between $L_d$ and $L_q$) and proper choice of $I_q$ and $I_d$.

Further, the flux linkages of the plant may be expressed as:

$$\lambda_d = L_d I_d - \lambda_m = L_d I_d - \frac{2}{N_p}K_e \quad \text{(Equation 4)}$$

$$\lambda_q = L_q I_q \quad \text{(Equation 5)}$$

Note that the d-axis flux linkage comprises the flux due to the permanent magnets $\lambda_m$, and an opposing flux component due to the d-axis stator current. In terms of the flux linkages, the voltage equations may be restated as:

$$V_d = \dot{\lambda}_d + \omega_e \lambda_q + I_d R \quad \text{(Equation 6)}$$

$$V_q = \dot{\lambda}_q - \omega_e \lambda_d + I_q R \quad \text{(Equation 7)}$$

In, the steady state, the voltage equations may become, $$V_d = \omega_e \lambda_q + I_d R \quad \text{(Equation 8)}$$

$$V_q = -\omega_e \lambda_d + I_q R \quad \text{(Equation 9)}$$

The motor 20 together with the control module 30 makes up a closed-loop system that has a certain frequency response characteristic. As can be appreciated, the frequency response of the closed-loop system is governed by a set of model equations that defines a transfer function that transforms the input current command $I_R$ to the output current $I_M$. In other words, the control module 30 regulates the output current $I_M$ by sending the actual motor voltage command $V_M$ generated based on the input current command $I_R$. $I_M$ is the current measured and fed back to the control module 30.

The modification module 320 takes as input from the motor 20 the measured feedback current $I_M$. Based on the measured feedback current $I_M$, the modification module 320 decouples the d-axis component $I_d$ of the output current $I_A$ from the variations of the q-axis current component $I_q$.

The compensation modules 306 and 310 make up a matrix-valued (or, multi-dimensional) proportional-integral (PI) controller that compensates for a difference $I_E$ between a commanded current $I_R$ and the measured current $I_M$ to control the motor 20. The compensation module 306 produces a proportional voltage command $V_P$ from a difference current $I_E$ (determined by the subtraction module 304). The compensation module 306 along with the integration module 308 produces an integral voltage command $V_I$. The addition module 312 combines the voltage commands $V_P$ and $V_I$ to produce a voltage command $V_C$. The proportional voltage command $V_P$ and the integral voltage command $V_I$ are determined in such a way that the combined voltage command $V_C$, when applied to the motor 20, causes the overall current to current transfer function to be of a specific, desired order. It is to be noted that each of $I_R$, $I_M$, $I_E$, $V_P$, $V_I$, and $V_C$ has a d-axis component and a q-axis component. Also, $I_R$, $I_M$, $I_E$, $V_P$, $V_I$, and $V_C$ represent vectors and not scalar values.

The compensation module 306 is a proportional controller and the compensation module 310 is an integral controller. The proportional compensation module $C_P$ aids in configuring the frequency response of the closed-loop system when the first order type response is desired, in addition to providing beneficial tradeoffs between the motor input disturbance transfer function behavior and the current measurement noise transfer function behavior. When a higher order transfer function (e.g., a third order) is desired, a different configuration than the PI controller is utilized.

As used herein, the term "module" or "sub-module" refers to an application specific integrated circuit (ASIC), an electronic circuit, a processor (shared, dedicated, or group) and memory that executes one or more software or firmware programs, a combinational logic circuit, and/or other suitable components that provide the described functionality. When implemented in software, a module or a sub-module can be embodied in memory as a non-transitory machine-readable storage medium readable by a processing circuit and storing instructions for execution by the processing circuit for performing a method. Moreover, the modules and sub-modules shown in FIG. 3 may be combined and/or further partitioned.

In some embodiments, the control module 30 is a feedback controller having a closed-loop. That is, the output current of the motor 20 is fed back to the control module 30 and the control module 30 uses the feedback to regulate the output of the motor 20. As the output current $I_M$ is fed back to the control module 30, a controller windup may be generated, where motor voltage command $V_R$ may exceed actual motor voltage command $V_M$. This can lead to instability in a motor control system because of a windup condition that is generated in this circumstance.

Control systems are typically designed to satisfy a set of linear performance metrics, but the control systems typically utilize actuators, such as inverters, that have operating limits. Controller windup may occur when the control module 30 produces control signals that are beyond actuator capabilities, causing saturation. Under a saturation condition, the control signals that are applied to the plant are limited and every component of the controller that has memory (or states) is updated incorrectly. This condition can result in controllers with memory accumulating large errors, which can return to correct values only after the system has come out of saturation and remained in this condition for a period of time. Thus, when controller windup occurs, the system can potentially remain in the saturated condition for a period of time longer than desirable, and ultimately degrade overall performance.

As described in more detail below, the anti-windup scheme consisting of modules 301, 316 and 318 selectively detects a voltage saturation condition and supplies an accurate representation of the actual motor voltage command $V_M$ to an input of the control system, thereby improving system performance. A voltage saturation condition may occur when a vector summation of an output of the current regulators of both the d and q axes current loops becomes greater in magnitude than the available DC link voltage $V_{DC}$. A voltage saturation may be expressed according to the following equation:

$$\sqrt{V_{dR}^2 + V_{qR}^2} \geq V_{DC} \qquad \text{(Equation 10a)}$$

Figure 4:
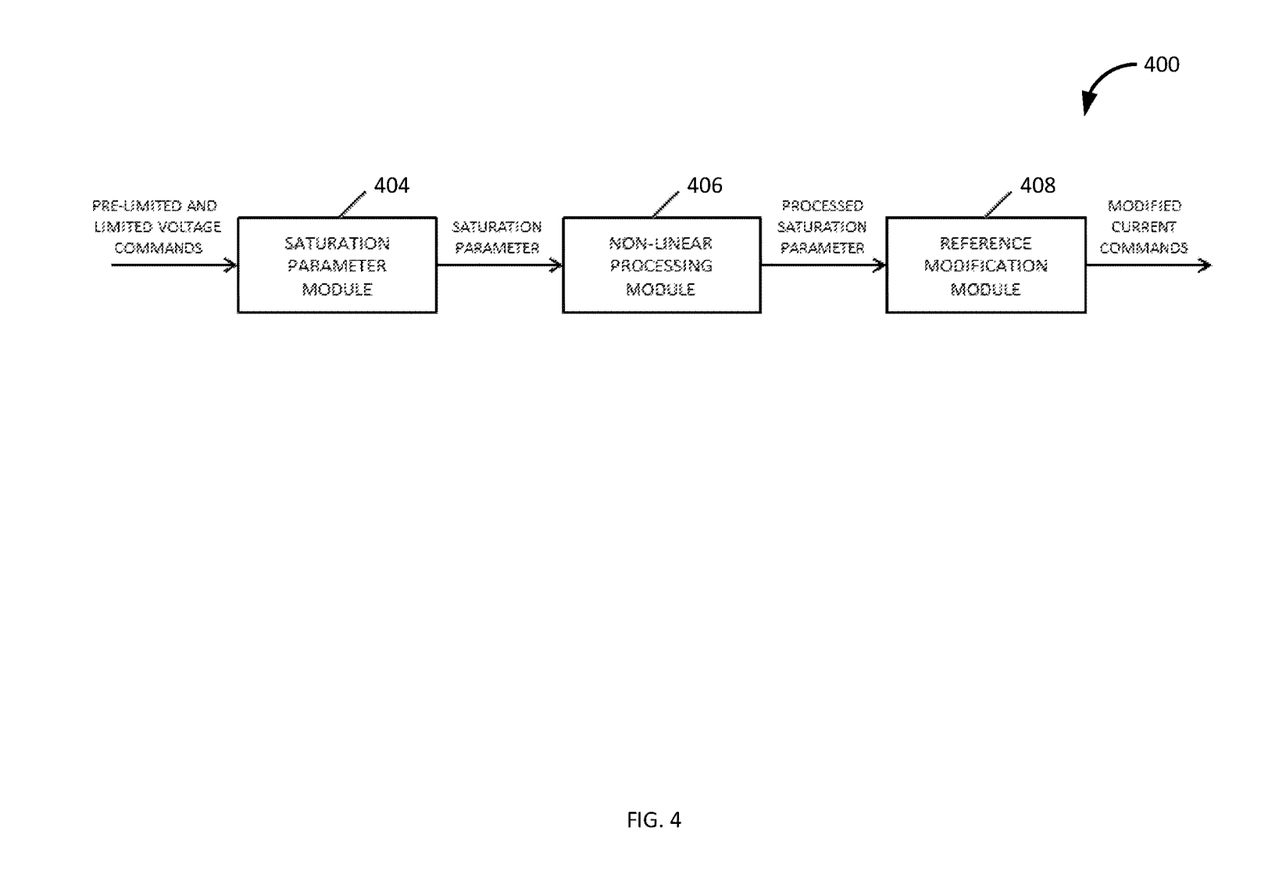
FIG. 4 is an exemplary block diagram of an anti-windup module in accordance with exemplary embodiments.

The anti-windup scheme is shown in FIG. 4. The limiter module 316 (FIG. 3) determines if the commanded voltage $V_R$ exceeds a maximum available supply voltage. In the case the commanded voltage $V_R$ exceeds the maximum available supply voltage or a set threshold voltage, the magnitude of the voltage vector $V_M$ is set equal to the following value based on the following equation according to some embodiments:

$$|V_M| = V_{DC} \qquad \text{(Equation 10b)}$$

As also shown in FIG. 4, the anti-windup module 400 includes a saturation parameter module 404. The saturation parameter module 404 computes a saturation parameter, which is a value indicative of a magnitude of saturation. In some embodiments, the saturation parameter is related to the degree by which the motor voltage command $V_R$ exceeds an available voltage that can be provided by the control loop to the motor. Accordingly, the degree of saturation $\gamma_V$ may represent a ratio of the voltage command and the actual voltage provided to the motor. The degree of saturation $\gamma_V$ defined by the following equation:

$$\gamma_V = \frac{|V_R|}{V_{DC}} \qquad \text{(Equation 11)}$$

where $|V_R|$ is the magnitude of the motor voltage command $V_R$ and $V_{DC}$ is a supply voltage. The voltage saturation nonlinearity may be radial geometrically, and the degree of saturation $\gamma_V$ may be more accurately detected by utilizing a ratio of the total voltage vector magnitudes rather than differences of the original and limited control signals. As can be appreciated by the above equation, the DC link voltage $V_{DC}$ is used for accuracy, as actual motor voltage command $V_M$ may not accurately represent the voltage that the inverter is capable of providing. More specifically, $V_M$ is inaccurate for calculating $\gamma_V$ when the voltage limiting is not performed by the direction preserving voltage limiter.

In another embodiment, the saturation parameter is expressed relative to an amount of saturation $\gamma_{Va}$, which may be additionally calculated by the saturation parameter module 404 by using the following equation:

$$\gamma_{Va} = \frac{|V_R| - V_{DC}}{V_{DC}} \quad \text{(Equation 12)}$$

The amount of saturation $\gamma_{V_\gamma}$ defines the magnitude of the commanded voltage from the maximum voltage limit circle, defined by the arc represented by $V_{max}$ in FIG. 2. Again, a scaled version of $V_{DC}$ similar to one mentioned above, may also be used.

By utilizing the ratios defined above in the calculations, for example, for the degree of saturation $\gamma_V$ and amount of saturation $\gamma_{Va}$, the geometry of the voltage constraint is considered. In other words, the direction of the voltage constraint is retained, and therefore the anti-windup scheme 400 may more accurately determine a modified current command. These modified current commands facilitate preventing integrator windup.

In addition, the saturation parameter module 404 calculates a saturation parameter. In some embodiments, the saturation parameter is an inverse degree of saturation $\gamma_{Vinv}$ defined by the following equation:

$$\gamma_{Vinv} = \frac{1}{\gamma_V} \quad \text{(Equation 13)}$$

Alternatively, the saturation parameter may be an inverse of the amount of saturation $\gamma_{Va}$. A ratio that may computed by the saturation degree module 404 from $\gamma_{V_\gamma}$ is the limited amount of saturation defined as:

$$\gamma_{Valim} = \min(1 - \gamma_{Va}, 1) \quad \text{(Equation 14)}$$

For high bandwidth systems, where $\gamma_{Va}$ can become larger than unity in some circumstances, may result in $\gamma_{Valim}$ having reduced accuracy.

The saturation parameter module 404 outputs the saturation parameter to a non-linear processing module 406.

The nonlinear processing module 406 of the anti-windup module 400 reduces noise on the output of the saturation parameter without being influenced by a previous state, thereby generating a processed saturation parameter. The non-linear processing module 406 does not include a memory and does not use any historical information of the input signal. Transient saturation rather than steady state saturation is the more important issue in practical control systems since the reference changes continuously. Coupled with the requirement of high bandwidth current regulation for several different reasons, the above voltage limiter scheme can sometimes result in a noisy reference, ultimately resulting in noisy outputs. A standard low-pass filter to reduce this noise is not desirable because not only does the filter introduce lag in the feedback, but it has states, and thus may itself suffer from windup, causing a variation in the signal.

The nonlinear processing module 406 acts similar to a pseudo-filter and is implemented by utilizing a nonlinear function F whose output y(t) is a function of the present input x(t) and not on previous values (or states) of the input. Mathematically, this operation may be defined as shown below.

$$y(t) = F(x(t)) \quad \text{(Equation 15)}$$

In some embodiments, the nonlinear processing module 406 is a square-root function. It is clear that other functions may be utilized, with some of the requirements being that the output may only be a function of the present value of the input, and not dependent on previous states; the function may pass through the origin (i.e., output should be zero when input is zero), and the output may be equal to the input when the input is unity. Such functions reduce the transient spikes on the voltage ratios when configured properly by virtue of their smooth shape. An example of a non-linear processing (pseudo-filtering) function is defined by the following equation:

$$\gamma_d = \sqrt{\gamma_{Vinv}} \quad \text{(Equation 16)}$$

A reference modification module 408 generates an modified current command from the processed saturation parameter.

The reference modification module 408 may utilize a reference modification function that increases $I_d$ and reduces $I_q$. The flux commands may be modified based on the extent of voltage saturation. In general, the flux commands may be modified by utilizing two ratios $\gamma_d$ and $\gamma_q$ that are functions of the extent of voltage saturation. These ratios may be defined as:

$$\gamma_d = \frac{\lambda_{dT}}{\lambda_{dR}} = \frac{L_d I_{dT} - \lambda_m}{L_d I_{dR} - \lambda_m} \quad \text{(Equation 17)}$$

$$\gamma_q = \frac{L_q I_{qT}}{L_q I_{qR}} = \frac{I_{qT}}{I_{qR}} \quad \text{(Equation 18)}$$

By solving the above equations, the modified current reference are obtained as:

$$I_{dT} = (1 - \gamma_d)\frac{\lambda_m}{L_d} + \gamma_d I_{dR} \quad \text{(Equation 19)}$$

$$I_{qT} = \gamma_q I_{qR} \quad \text{(Equation 20)}$$

The quantity $$\frac{\lambda_m}{L_d}$$

is a maximum possible value of the d-axis current, at which the total d-axis flux linkage becomes zero. This may be defined as $$I_{dmax} = \frac{\lambda_m}{L_d}.$$

In addition, the reference modification function may be a straight-line that transitions the control system operation into an enhanced field-weakening mode, the extent of which is determined by the ratio $\gamma_d$. It may also be seen that the modified reference can only become $I_{dmax}$ if $\gamma_d$ becomes zero, which is very unlikely in practical motor control applications.

The aforementioned d-axis equation may directly be utilized for reference modification by using different values of $I_{dmax}$ which may be more or less conservative, using the following reference modification equations.

$$I_{dT}=(1-\gamma_d)I_{dmax}+\gamma_d I_{dR} \quad \text{(Equation 21)}$$

$$I_{qT}=\gamma_q I_{qR} \quad \text{(Equation 22)}$$

In this case the ratio no longer represents flux modification. One alternative value may be defined as:

$$I_{dmax} = (1 \pm \alpha_d)\frac{\lambda_m}{L_d} \quad \text{(Equation 23)}$$

Here, $\alpha_d$ is a positive scalar, typically a fraction less than unity, which results in a maximum d-axis current value which is more or less than the value based on the flux limit.

Another value of the d-axis maximum current may computed online, based on the q-axis reference current and another limit on the total current, which may be due to the inverter or the machine. For instance, a current limit $I_{lim}$ may be defined based on the stall current on the machine, or on the maximum capability of the FETs used. With this, the d-axis maximum current may be computed as, $$I_{dmax}=\sqrt{I_{lim}^2-I_{qR}^2} \quad \text{(Equation 24)}$$

$I_{dT}$ and $I_{qT}$ are modified current references that represent the current commands.

Figure 5:
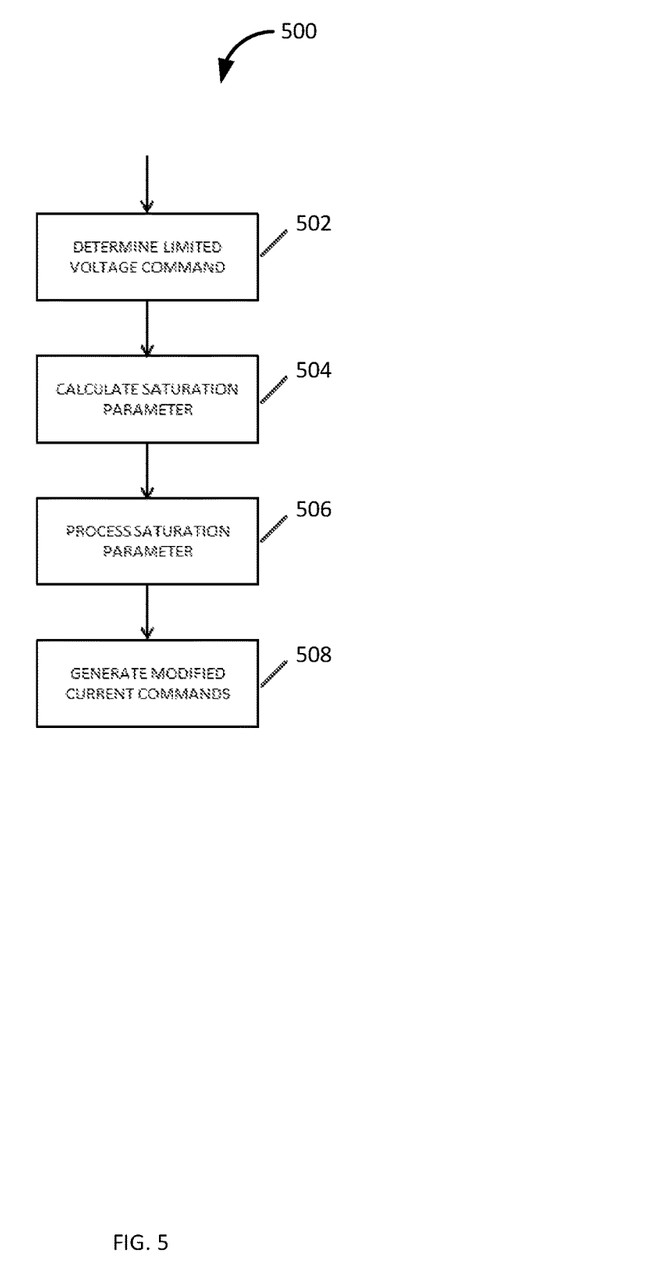
FIG. 5 is an exemplary block diagram of a anti-windup method in accordance with exemplary embodiments.

FIG. 5 is a flow diagram for a control method that can be performed by the control module 30 in accordance with some embodiments of the invention. As can be appreciated in light of the disclosure, the order of operation within the method is not limited to the sequential execution as illustrated in FIG. 5, but may be performed in one or more varying orders as applicable and in accordance with the present disclosure.

At block 502, the control module 30 determines a limited voltage command in response to a commanded voltage exceeding an available voltage of a motor power source. The limited voltage command may be applied to an electric motor. At block 504, the control module 30 determines a saturation parameter based on the limited voltage command. The saturation parameter indicates a magnitude of the commanded voltage exceeding the available voltage. At block 506, the control module 30 determines a processed saturation parameter by utilizing a non-linear smoothing function. At block 508, the control module 30 generates an current command based on the processed saturation parameter. The modified current command is applied to the control system to improve current command tracking.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A system for preventing controller windup in an electric motor, the system comprising:
   a limiting module that determines a limited voltage command in response to a commanded voltage exceeding an available voltage of a motor power source, the limited voltage command is applied to an electric motor;
   a saturation parameter module that determines a saturation parameter based on the limited voltage command, the saturation parameter indicates a magnitude of the commanded voltage exceeding the available voltage, the saturation parameter is a reciprocal of a ratio of the commanded voltage to the limited voltage command;
   a processing module that processes the saturation parameter to generate a processed saturation parameter; and
   a reference current modifier module that generates a modified current command based on the processed saturation parameter, the modified current command is applied to the control system to improve the current command tracking.

2. The system of claim 1, wherein the modified current command retains a proportion of the direct axis (d-axis) current and a quadrature axis (q-axis) current provided by the commanded voltage.

3. The system of claim 1, wherein the limiting module determines the limited voltage command by preserving a vector direction of the commanded voltage.

4. The system of claim 1, wherein the modified current command comprises a d-axis correction provided by the following equation:

$$I_{dT}=(1-\gamma_d)I_{dmax}+\gamma_d I_{dR},$$

$I_{dT}$ is a d-axis component of the modified current command, $\gamma_d$ is a d-axis component of the saturation parameter, $I_{dR}$ is a reference current command, and $I_{dmax}$ is a maximum value of the d-axis current.

5. The system of claim 1, wherein the modified current command comprises a q-axis correction provided by the following equation:

$$I_{qT}=\gamma_q I_{qR},$$

$I_{qT}$ is a q-axis component of the modified current command, $\gamma_q$ is a q-axis component of the saturation parameter, and $I_{qR}$ is a q-axis component of a reference current command.

6. The system of claim 1, wherein the saturation parameter is based on a difference of the commanded voltage and the available voltage.

7. The system of claim 1, wherein the processed saturation parameter is represented by a square root of an inverse of the saturation parameter.

8. The system of claim 1, wherein the saturation parameter is an inverse of an amount of saturation.

9. The system of claim 1, wherein the saturation parameter retains a direction of a limited voltage command.

10. A method for preventing controller windup in an electric motor, the method comprising:
    determining a limited voltage command in response to a commanded voltage exceeding an available voltage of a motor power source, the limited voltage command is applied to an electric motor;
    determining a saturation parameter based on the limited voltage command, the saturation parameter indicates a magnitude of the commanded voltage exceeding the available voltage, the saturation parameter is an inverse ratio of the commanded voltage to the limited voltage command;
    processing the saturation parameter to generate a processed saturation parameter while retaining a nonlinear state; and
    generating a modified current command based on the processed saturation parameter, the modified current command is applied to the electric motor to improve current command tracking.

11. The method of claim 10, wherein the modified current command retains a proportion of the direct axis (d-axis) current and a quadrature axis (q-axis) current provided by the commanded voltage.

12. The method of claim 10, wherein the limited voltage command is determined by preserving a vector direction of the commanded voltage.

13. The method of claim 10, wherein the modified current command comprises a d-axis correction provided by the following equation:

$$I_{dT} = (1-\gamma_d)I_{dmax} + \gamma_d I_{dR},$$

$I_{dT}$ is a d-axis component of the modified current command, $\gamma_d$ is a d-axis component of the saturation parameter, $I_{dR}$ is a reference current command, and $I_{dmax}$ is a maximum value of the d-axis current.

14. The method of claim 10, wherein the modified current command comprises a q-axis correction provided by the following equation:

$$I_{qT} = \gamma_q I_{qR},$$

$I_{qT}$ is a q-axis component of the modified current command, $\gamma_q$ is a q-axis component of the saturation parameter, and $I_{qR}$ is a q-axis component of a reference current command.

15. The method of claim 10, wherein the saturation parameter is based on a difference of the commanded voltage and the available voltage.

16. The method of claim 10, wherein the processed saturation parameter is represented by a square root of an inverse of the saturation parameter.

17. The method of claim 10, wherein the saturation parameter is an inverse of an amount of saturation.

18. The method of claim 10, wherein the saturation parameter retains a direction of a limited voltage command.

* * * * *